United States Patent
Matsuda et al.

(10) Patent No.: US 9,341,758 B2
(45) Date of Patent: May 17, 2016

(54) OPTICAL LAMINATED BODY AND METHOD FOR PRODUCTION OF OPTICAL LAMINATED BODY

(71) Applicant: NITTO DENKO CORPORATION, Ibaraki-shi, Osaka (JP)

(72) Inventors: Shoichi Matsuda, Ibaraki (JP); Tadayuki Kameyama, Ibaraki (JP); Hiroshi Tomohisa, Ibaraki (JP); Yoshiaki Asanoi, Ibaraki (JP); Isao Hirose, Ibaraki (JP); Yoshihiro Kitamura, Ibaraki (JP); Kanji Nishida, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 104 days.

(21) Appl. No.: 14/119,802

(22) PCT Filed: Dec. 5, 2012

(86) PCT No.: PCT/JP2012/081501
§ 371 (c)(1),
(2) Date: Nov. 22, 2013

(87) PCT Pub. No.: WO2013/121655
PCT Pub. Date: Aug. 22, 2013

(65) Prior Publication Data
US 2015/0153495 A1   Jun. 4, 2015

(30) Foreign Application Priority Data
Feb. 17, 2012   (JP) .................. 2012-032309

(51) Int. Cl.
*G02B 5/30* (2006.01)
*B05D 5/06* (2006.01)

(52) U.S. Cl.
CPC ............... *G02B 5/3016* (2013.01); *B05D 5/06* (2013.01); *G02B 5/3033* (2013.01)

(58) Field of Classification Search
CPC ....... G02B 5/3016; G02B 5/3033; B05D 5/06
See application file for complete search history.

(56) References Cited

U.S. PATENT DOCUMENTS 6,541,185 B1    4/2003   Matsunaga et al.
2002/0105608 A1*  8/2002   Lazarev ............ G02F 1/133502
                                                    349/96

(Continued)

FOREIGN PATENT DOCUMENTS

CN    101501142 A    8/2009
JP    H10-160933 A    6/1998

(Continued)

OTHER PUBLICATIONS

International Search Report dated Mar. 12, 2013 issued in corresponding application No. PCT/JP2012/081501.

(Continued)

*Primary Examiner* — James Dudek
(74) *Attorney, Agent, or Firm* — Westerman, Hattori, Daniels & Adrian, LLP

(57) ABSTRACT

The present invention provides an optical laminated body having a patterning polarizer layer in which a more complicated pattern can be set. The optical laminated body 1A of the present invention has a patterning polarizer layer 3A having at least two polarizing regions 31A and 32A having different single transmittances, and a substrate 2A. The two polarizing regions 31A and 32A are different in thickness.

4 Claims, 5 Drawing Sheets

(56) References Cited

U.S. PATENT DOCUMENTS

| | | | |
|---|---|---|---|
| 2002/0132065 A1* | 9/2002 | Sahouani | G02F 1/133711 |
| | | | 428/1.2 |
| 2003/0071243 A1* | 4/2003 | Sahouani | C09K 19/3475 |
| | | | 252/299.4 |
| 2003/0137732 A1* | 7/2003 | Sugino | B29C 55/04 |
| | | | 359/487.01 |
| 2005/0072959 A1 | 4/2005 | Moia et al. | |
| 2006/0170901 A1 | 8/2006 | Tanitsu et al. | |
| 2009/0290214 A1 | 11/2009 | Cho et al. | |
| 2010/0039608 A1 | 2/2010 | Matsuda et al. | |
| 2014/0085597 A1 | 3/2014 | Katou et al. | |

FOREIGN PATENT DOCUMENTS

| | | |
|---|---|---|
| JP | 2001-159713 A | 6/2001 |
| JP | 2002-357720 A | 12/2002 |
| JP | 2004-518179 A | 6/2004 |
| JP | 2005-352321 A | 12/2005 |
| JP | 2006-225126 A | 8/2006 |
| JP | 2009-173849 A | 8/2009 |
| JP | 2009-538957 A | 11/2009 |
| JP | 2010-277974 A | 12/2010 |
| JP | 2010-280079 A | 12/2010 |
| JP | 2011-100150 A | 5/2011 |
| JP | 2011-131527 A | 7/2011 |
| KR | 10-2014-0022890 A | 2/2014 |
| TW | 201202806 A1 | 1/2012 |

OTHER PUBLICATIONS

Korean Office Action dated Nov. 28, 2014, issued in corresponding Korean Patent Application No. 10-2013-7024120, w/partial English translation (9 pages).

Taiwanese Office Action dated Jul. 18, 2014, issued in corresponding Taiwanese Application No. 101147531; w/partial English translation. (7 pages).

Office Action dated Mar. 23, 2015, issued in corresponding Chinese Patent Application No. 201280033480.0 with English translation (17 pages).

Office Action dated Jul. 20, 2015, issued in counterpart Taiwanese Patent Application No. 101147531, with English translation (6 pages).

Office Action dated Nov. 24, 2015, issued in counterpart Japanese Application No. 2012-032309, partial English translation. (10 pages).

Office Action dated Jul. 28, 2015, issued in counterpart Korean application No. 10-2013-7024120 (w/English translation) (9 pages).

Office Action dated Dec. 8, 2015, issued in Chinese Patent Application No. 201280033480.0, with Partial English translation. (17 pages).

Office Action dated Dec. 15, 2015, issued in Korean Patent Application No. 10-2013-7024120, with Partial English translation. (11 pages).

Office Action dated Mar. 15, 2016, issued in counterpart Japanese Patent Application No. 2012-032309, with Partial English translation. (5 pages).

* cited by examiner

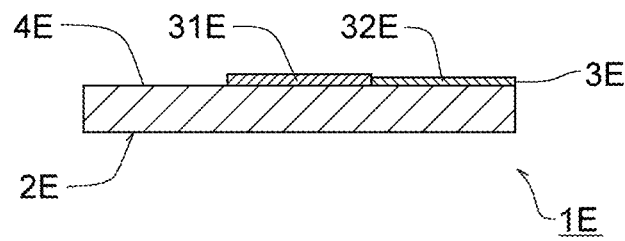
Fig.8
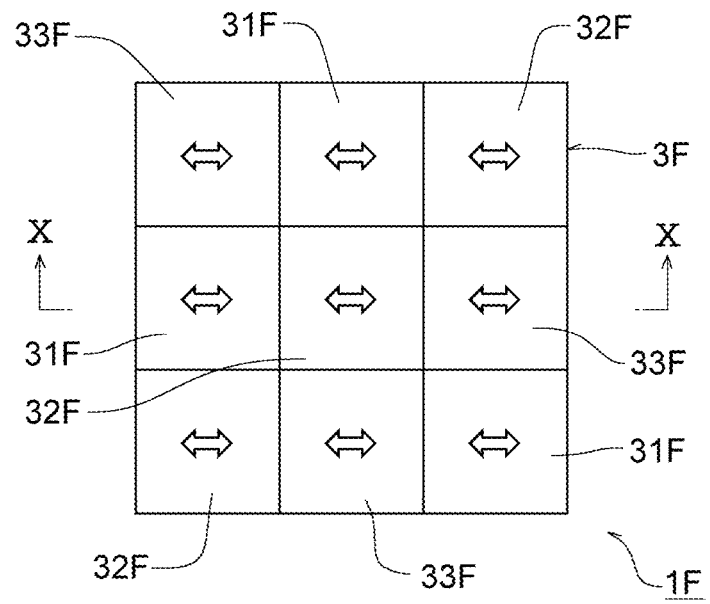
Fig.9
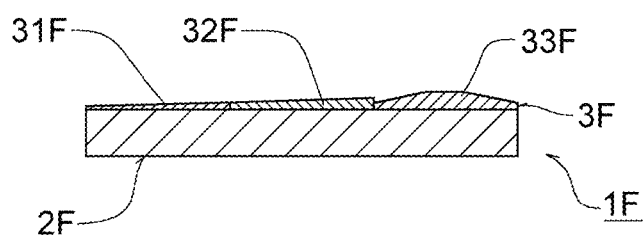
Fig.10
o A
o B
Fig.11

OPTICAL LAMINATED BODY AND METHOD FOR PRODUCTION OF OPTICAL LAMINATED BODY

TECHNICAL FIELD

The present invention relates to an optical laminated body having at least two polarizing regions having different single transmittances, and a method for production of the optical laminated body.

BACKGROUND ART

It is known that when a coating solution containing a dichroic liquid crystal compound having lyotropic liquid crystallinity is applied to a substrate surface, which has been subjected to an alignment treatment, and the coating film is cured, a polarizer layer having an absorption axis in a predetermined direction is obtained (Patent Document 1). The principle on which the polarizer layer has an absorption axis in a predetermined direction lies in that the dichroic liquid crystal compound is aligned in a predetermined direction in accordance with the substrate surface subjected to an alignment treatment.

By applying the above-mentioned principle, a substrate, the surface of which is divided into a plurality of regions, and each of which is subjected to a different alignment treatment, can be used as the aforementioned substrate, and a patterning polarizer layer having a plurality of polarization regions which differ in the direction of the absorption axis can be formed (Patent Documents 2 and 3).

Since the patterning polarizer layer has a plurality of polarizing regions different in the direction of the absorption axis as described above, transmission or non-transmission of light can be controlled in accordance with the directions of absorption axes of those polarizing regions. That is, when specific linearly polarized light is thrown on the patterning polarizer layer, the polarized light is transmitted at some polarizing regions, and the polarized light is not transmitted at other polarizing regions.

An optical laminated body having the above-mentioned patterning polarizer layer can be used for a genuineness determination medium utilizing a latent image, or the like.

In conventional patterning polarizer layers, however, only transmission or non-transmission of polarized light in a plurality of polarizing regions can be controlled. Therefore, when the conventional patterning polarizer layer is used for, for example, a genuineness determination medium, it is difficult to set in the polarizer layer a latent image having a more complicated pattern.

[Patent Document 1]

Japanese Unexamined Patent Publication No. 2009-173849

[Patent Document 2]

Japanese Patent No. 4168173 (Japanese Unexamined Patent Publication No. 2001-159713)

[Patent Document 3]

Japanese Patent No. 4175455 (Japanese Unexamined Patent Publication No. 2002-357720)

An object of the present invention is to provide an optical laminated body having a patterning polarizer layer in which a more complicated pattern can be set, and a method for production of the optical laminated body.

The optical laminated body of the present invention has a patterning polarizer layer having at least two polarizing regions having different single transmittances, and a substrate.

In a preferable optical laminated body of the present invention, the patterning polarizer layer is formed by applying to the surface of the substrate a coating solution containing a dichroic liquid crystal compound using a printing method.

In a further preferable optical laminated body of the present invention, the optical laminated body has a part in which the two polarizing regions are different in thickness.

In a further preferable optical laminated body of the present invention, the patterning polarizer layer contains an aligned dichroic liquid crystal compound.

In a further preferable optical laminated body of the present invention, the dichroic liquid crystal compound has lyotropic liquid crystallinity.

In another aspect of the present invention, a method for production of an optical laminated body is provided.

In this method for production of an optical laminated body, a coating solution containing a dichroic liquid crystal compound is applied to the surface of a substrate using a printing machine to form a patterning polarizer layer on the surface of the substrate.

In a preferable method for production of an optical laminated body, the patterning polarizer layer is formed by applying a coating solution to the substrate while changing the application amount of the coating solution.

In a further preferable method for production of an optical laminated body, the surface of the substrate is subjected to an alignment treatment.

The optical laminated body of the present invention has a patterning polarizer layer having at least two polarizing regions having different single transmittances, and therefore a more complicated pattern can be set.

BRIEF DESCRIPTION OF THE DRAWINGS

FIG. 8 is a view showing an end face when cut along the line VIII-VIII of FIG. 7.

FIG. 9 is a plan view schematically showing an optical laminated body according to a sixth embodiment.

FIG. 10 is a view showing an end face when cut along the line X-X of FIG. 9.

FIG. 11 is a photographic view of an enlarged part of the surface of an optical laminated body prepared in Example 1.

DESCRIPTION OF EMBODIMENTS

Figure 1:
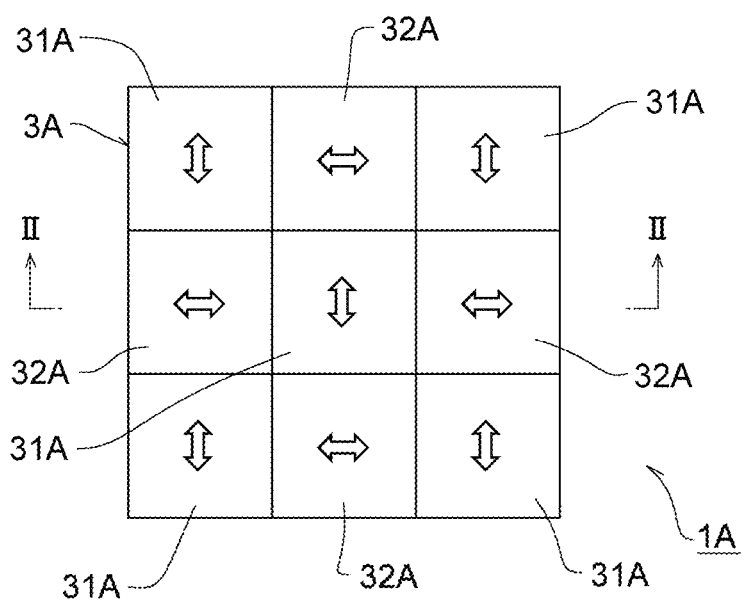
FIG. 1 is a plan view schematically showing an optical laminated body according to a first embodiment.

Specific description of the present invention will be given below.

Herein, the term is preceded by "first" or "second" in some cases, but the "first" or the like is added for discrimination of terms, and does not mean superiority or inferiority, sequence and the like.

Herein, the expression of "PPP to QQQ" means "no less than PPP and no more than QQQ".

[Outline of Optical Laminated Body]

An optical laminated body of the present invention includes a substrate and a patterning polarizer layer laminated on the surface of the substrate.

The patterning polarizer layer may be provided on each of the front surface or back surface of the substrate, but the patterning polarizer layer is normally provided on one of the surfaces (front surface) of the substrate.

The substrate may have an alignment layer. When a substrate having an alignment layer is used, a surface of the substrate on which a patterning polarizer layer is laminated is the surface of the alignment layer. That is, the patterning polarizer layer is laminated on the surface of the alignment layer provided on the substrate.

The optical laminated body of the present invention may include other layers in addition to the aforementioned substrate, alignment layer and patterning polarizer layer. Examples of other layers include such as a known protective layer, retardation layer and anti-reflection layer.

The patterning polarizer layer has at least two polarizing regions having different single transmittances. That is, the patterning polarizer layer has a plurality of polarizing regions having different single transmittances. The plurality of polarizing regions may be regularly arranged or irregularly arranged in the plane of the substrate. Arrangement of the plurality of polarizing regions can be appropriately set according to a desired pattern.

The polarizing region is a region having the optical characteristic of converting natural light or various kinds of polarized light into linearly polarized light. That is, the polarizing region is a region having the optical characteristic of transmitting specific linearly polarized light when natural light or various kinds of polarized light is applied thereto.

The single transmittance is a Y value of tristimulus values based on the two-degree field of view in JIS Z 8701-1995. The single transmittance can be measured in accordance with the method described in Examples below.

The single transmittance of each of the plurality of polarizing regions is not particularly limited, but is, for example, 10% to 90%.

The difference in single transmittance between one polarizing region and another polarizing region is not particularly limited, but is, for example, 1% to 80%.

Preferably, the at least two polarizing regions have parts different in thickness from one another. Specifically, the thickness of a part or the whole of one polarizing region and the thickness of a part or the whole of another polarizing region are different from each other.

The method for formation of the patterning polarizer layer is not particularly limited, however, preferably the patterning polarizer layer is formed by applying to the surface of the substrate a coating solution containing a dichroic liquid crystal compound using a printing method.

Forming materials for the substrate and the patterning polarizer layer and a method for production of the optical laminated body will be described in detail later.

[First Embodiment of Optical Laminated Body]

Figure 2:
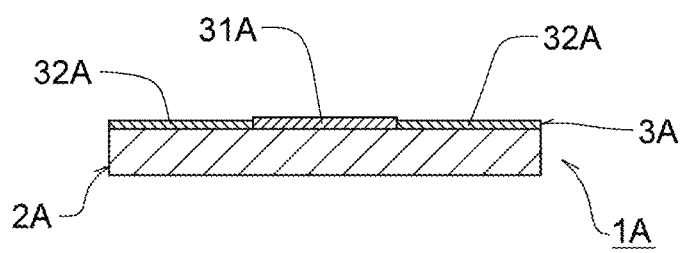
FIG. 2 is a view showing an end face when cut along the line II-II of FIG. 1.

FIG. 1 and FIG. 2 are schematic views of an optical laminated body according to a first embodiment of the present invention.

This optical laminated body 1A has a substrate 2A and a patterning polarizer layer 3A laminated on the surface of the substrate 2A.

The substrate 2A may have an alignment layer (not shown).

The patterning polarizer layer 3A has two polarizing regions 31A and 32A (a first polarizing region 31A and a second polarizing region 32A).

The single transmittance of the first polarizing region 31A is different from the single transmittance of the second polarizing region 32A. For example, the single transmittance of the first polarizing region 31A is smaller than the single transmittance of the second polarizing region 32A. Alternatively, the single transmittance of the first polarizing region 31A may be larger than the single transmittance of the second polarizing region 32A.

The first polarizing region 31A and the second polarizing region 32A each have an absorption axis in the plane. For example, the direction of the absorption axis of the first polarizing region 31A is orthogonal to the direction of the absorption axis of the second polarizing region 32A.

The bold arrow in each plan view indicates the direction of the absorption axis of each polarizing region (the same hereinafter). A transmission axis of the polarizing region is generated in a direction orthogonal to the absorption axis in the plane of the polarizing region.

Thicknesses of the two polarizing regions 31A and 32A may be the same, however, preferably the thicknesses of the two polarizing regions 31A and 32A are different. For example, the thickness of the first polarizing region 31A is larger than the thickness of the second polarizing region 32A.

The first polarizing region 31A and the second polarizing region 32A may be formed by the same forming material or forming materials that are different from each other. The first polarizing region 31A and the second polarizing region 32A may be composed by a laminated material having two or more layers.

By appropriately designing the thickness of each of the first polarizing region 31A and the second polarizing region 32A and materials for forming the regions, the patterning polarizer layer 3A having the first polarizing region 31A and the second polarizing region 32A, which have different single transmittances, can be formed.

In the patterning polarizer layer 3A of this embodiment, the intensity of light which is transmitted through the first polarizing region 31A having a large single transmittance is higher than the intensity of light which is transmitted through the second polarizing region 32A. The absorption axis of the first polarizing region 31A and the absorption axis of the second polarizing region 32A are in orthogonal relation. Therefore, when polarized light which is transmitted through the first polarizing region 31A falls on the optical laminated body 1A, the polarized light is not transmitted through the second polarizing region 32A. Accordingly, the first polarizing region 31A is brightly displayed, but the second polarizing region 32A is displayed in black.

[Second Embodiment of Optical Laminated Body]

Figure 3:
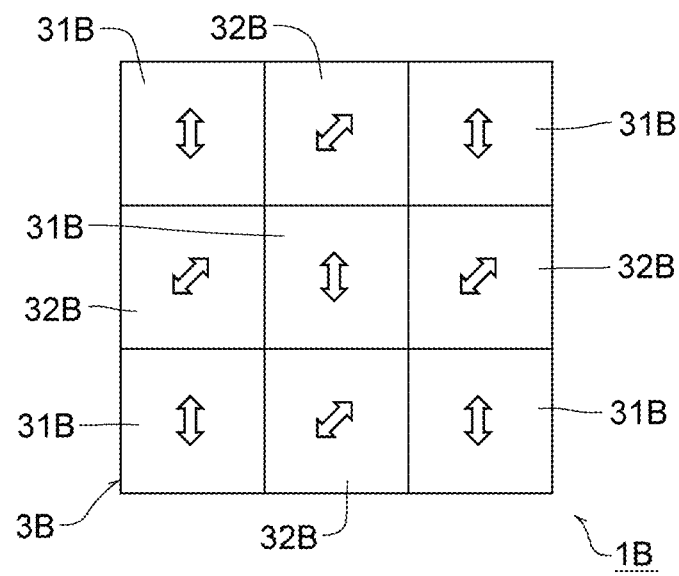
FIG. 3 is a plan view schematically showing an optical laminated body according to a second embodiment.

FIG. 3 is a schematic view of an optical laminated body according to a second embodiment of the present invention.

This optical laminated body 1B has a substrate (not shown in FIG. 3) and a patterning polarizer layer 3B in the same manner as in the above-described first embodiment, and the patterning polarizer layer 3B has a first polarizing region 31B and a second polarizing region 32B having different single transmittances.

This embodiment is different from the first embodiment in that the absorption axis of the first polarizing region 31B and the absorption axis of the second polarizing region 32B are arranged in the direction of crossing each other at an acute angle. Examples of the acute angle include 45 degrees ±5 degrees.

[Third Embodiment of Optical Laminated Body]

Figure 4:
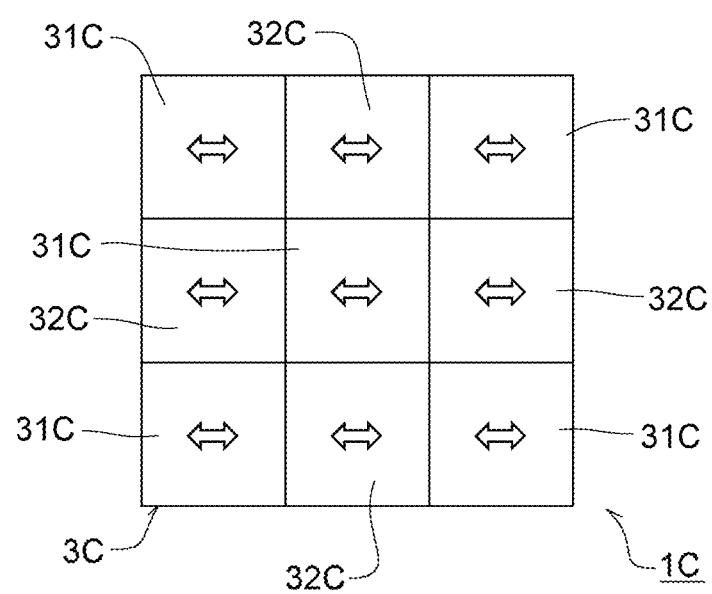
FIG. 4 is a plan view schematically showing an optical laminated body according to a third embodiment.

FIG. 4 is a schematic view of an optical laminated body according to the third embodiment of the present invention.

This optical laminated body 1C has a substrate (not shown in FIG. 4) and a patterning polarizer layer 3C in the same manner as in the above-described first embodiment, and the patterning polarizer layer 3C has a first polarizing region 31C and a second polarizing region 32C having different single transmittances.

The thicknesses of the two polarizing regions 31C and 32C may be the same, but the thicknesses are different in this embodiment as described in the first embodiment above. For example, the thickness of the whole of the first polarizing region 31C is larger than the second polarizing region 32C.

This embodiment is different from the first embodiment in that the absorption axis of the first polarizing region 31C and the absorption axis of the second polarizing region 32C are set to be in the parallel direction. The parallel includes not only 0 degree but also ±5 degrees.

In the patterning polarizer layer 3C of this embodiment, the absorption axis of the first polarizing region 31C and the absorption axis of the second polarizing region 32C are parallel to each other. Therefore, both the first polarizing region 31C and the second polarizing region 32C can transmit the same polarized light, but since the first polarizing region 31C and the second polarizing region 32C have different single transmittances, the intensities of their transmitted light are different. Accordingly, when one polarized light falls on the patterning polarizer layer 3C, one polarizing region (e.g. first polarizing region 31C) is displayed darkly as compared to the other polarizing region (e.g. second polarizing region 32C).

[Fourth Embodiment of Optical Laminated Body]

Figure 5:
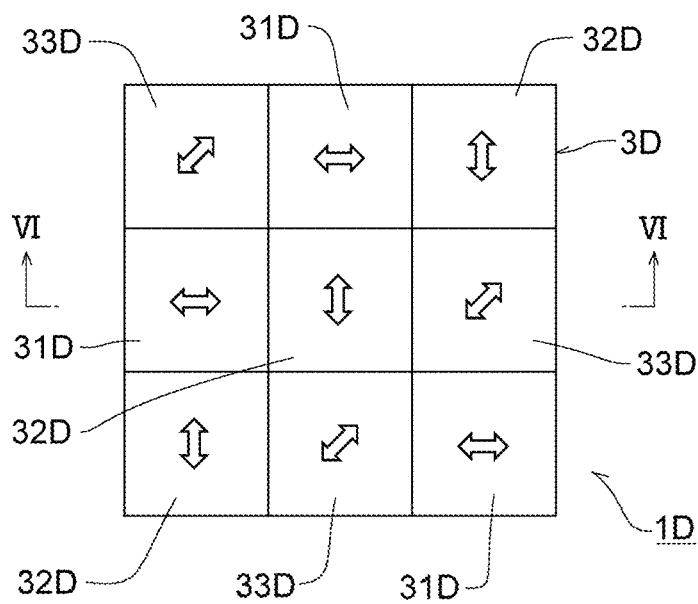
FIG. 5 is a plan view schematically showing an optical laminated body according to a fourth embodiment.
Figure 6:
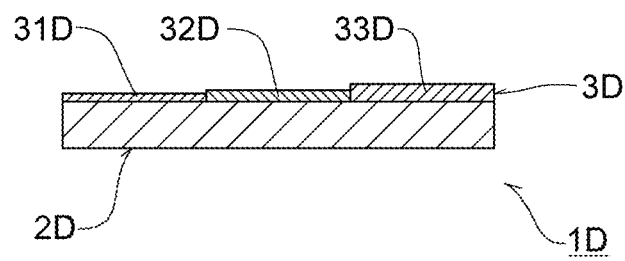
FIG. 6 is a view showing an end face when cut along the line VI-VI of FIG. 5.

FIG. 5 and FIG. 6 are schematic views of an optical laminated body according to the fourth embodiment of the present invention.

This optical laminated body 1D has a substrate 2D and a patterning polarizer layer 3D in the same manner as in the above-described first embodiment.

This embodiment is different from the first embodiment in that a patterning polarizer layer 3D has a first polarizing region 31D, a second polarizing region 32D, and a third polarizing region 33D having different single transmittances.

The directions of absorption axes of the first polarizing region 31D, the second polarizing region 32D and the third polarizing region 33D are not particularly limited. For example, the absorption axes of the first polarizing region 31D, the second polarizing region 32D and the third polarizing region 33D may be in the parallel direction, or the absorption axes of two polarizing regions selected from the first polarizing region 31D, second polarizing region 32D and third polarizing region 33D may be in the parallel direction, or the absorption axes of the first polarizing region 31D, second polarizing region 32D and third polarizing region 33D may be mutually in the non-parallel direction.

In the illustrated example, the absorption axis of the first polarizing region 31D and the absorption axis of the second polarizing region 32D are in the orthogonal direction, and the absorption axis of the third polarizing region 33D is in the direction of an acute angle with respect thereto.

The thicknesses of three polarizing regions 31D, 32D, 33D may be the same, however, preferably the thicknesses of the polarizing regions 31D, 32D, 33D are different. For example, the thickness of the whole of the first polarizing region 31D is smaller than the thicknesses of the second polarizing region 32D and the third polarizing region 33D. Further, the thickness of the whole of the second polarizing region 32D is smaller than the thickness of the third polarizing region 33D.

Since the patterning polarizer layer 3D of this embodiment has three polarizing regions 31D, 32D and 33D having different single transmittances, a more complicated pattern can be displayed as compared to the patterning polarizer layer of the first embodiment.

In the patterning polarizer layer of this embodiment, a fourth polarizing region and a fifth polarizing region can be further provided.

[Fifth Embodiment of Optical Laminated Body]

Figure 7:
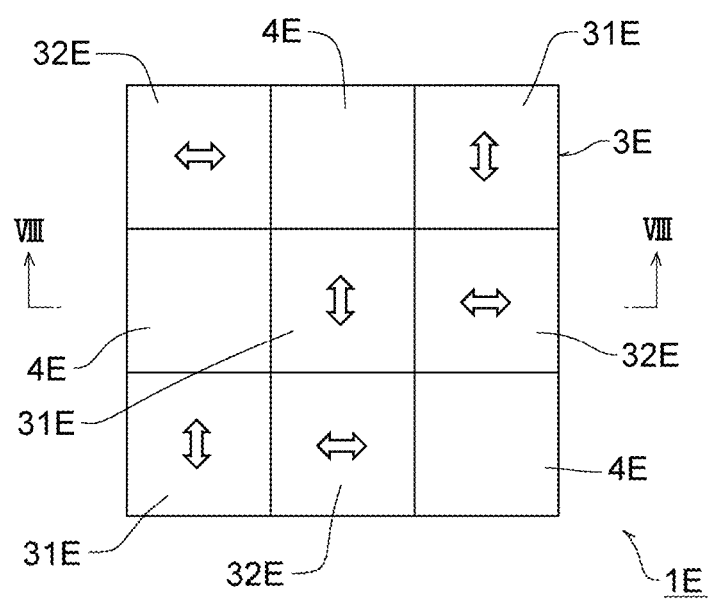
FIG. 7 is a plan view schematically showing an optical laminated body according to a fifth embodiment.

FIG. 7 and FIG. 8 are schematic views of an optical laminated body according to the fifth embodiment of the present invention.

This optical laminated body 1E has a substrate 2E and a patterning polarizer layer 3E in the same manner as in the above-described first embodiment, and the patterning polarizer layer 3E has a first polarizing region 31E and a second polarizing region 32E having different single transmittances.

This embodiment is different from the first embodiment in that the patterning polarizer layer 3E has a region 4E which does not function partially as a polarizer (referred to as a non-polarizing region).

For example, when no patterning polarizer layer 3E is formed on a partial region of the surface of the substrate 2E, the region does not function as a polarizer.

In the illustrated example, the non-polarizing region 4E is composed of a partial region of the substrate 2E, and therefore natural light and polarized light are directly transmitted at the non-polarizing region 4E.

[Sixth Embodiment of Optical Laminated Body]

FIG. 9 and FIG. 10 are schematic views of an optical laminated body according to the sixth embodiment of the present invention.

This optical laminated body 1F has a substrate 2F and a patterning polarizer layer 3F in the same manner as in the above-described first embodiment. The patterning polarizer layer 3F has a first polarizing region 31F, a second polarizing region 32F, and a third polarizing region 33F having different single transmittances in the same manner as in the above-described fourth embodiment.

This embodiment is different from the first and fourth embodiments in that the thicknesses of the polarizing regions 31F, 32F and 33F are partially different in the patterning polarizer layer 3E.

Specifically, the thickness of the first polarizing region 31F and the thickness of the second polarizing region 32F each gradually become larger as shown in FIG. 10, and continuity is established between one edge of the first polarizing region 31F and one edge of the second polarizing region 32F. Therefore, the maximum thickness of the first polarizing region 31F equals the minimum thickness of the second polarizing region 32F.

On the other hand, the third polarizing region 33F is the thickest at its central part, and the thickness of the third polarizing region 33F is discontinuous with respect to the first polarizing region 31F and the second polarizing region 32F. That is, there is a level difference in the thickness direction at the boundary between the third polarizing region 33F and the first and second polarizing regions 31F and 32F.

In this embodiment, the directions of the absorption axes of the first polarizing region 31F, the second polarizing region 32F and the third polarizing region 33F are not particularly limited, however, in the illustrated example, the absorption axes of the first polarizing region 31F, the second polarizing region 32F and the third polarizing region 33F are in the parallel direction.

In the patterning polarizer layer 3F of this embodiment, the thickness of each of the first polarizing region 31F, the second polarizing region 32F and the third polarizing region 33F is gradually or partially changed, so that the single transmittance in each of the first polarizing region 31F, the second polarizing region 32F and the third polarizing region 33F gradually or partially varies. Therefore, the patterning polarizer layer 3F of this embodiment can display a more complicated pattern as compared to a patterning polarizer layer having a polarizing region of uniform thickness, and can also display a multiple tone pattern resulting from an intensity variation of transmitted light.

[Other Embodiments of Optical Laminated Body]

The configuration of the optical laminated body of the present invention is not limited to the first to sixth embodiments, and can be variously changed within the intended scope of the present invention.

For example, two or more configurations arbitrarily selected from the first to sixth embodiments may be appropriately combined or used as a substitute. For example, the configuration of the second embodiment may be applied to any configuration selected from the third to sixth embodiments, or the configuration of the sixth embodiment may be applied to any configuration selected from the first to fifth embodiments.

The optical laminated body of the present invention has a patterning polarizer layer having at least two polarizing regions having different single transmittances, and the intensities of light which is transmitted through the polarizing regions having different single transmittances are different. Therefore, the patterning polarizer layer of the present invention enables setting of not only transmission or non-transmission of light dependent on the direction of the absorption axis of each polarizing region but also an intensity variation of transmitted light.

Thus, according to the present invention, an optical laminated body having a patterning polarizer layer having a more complicated pattern can be provided.

[Use of Optical Laminated Body of the Invention]

The optical laminated body of the present invention is not particularly limited, and for example, can be used for genuineness determination media such as forgery prevention labels; polarizing plates of image display devices such as three-dimensional image display devices; polarizing plates to be used for other devices; polarizing eyeglasses; and the like.

The optical laminated body of the present invention can also be provided with a latent image on its patterning polarizer layer. For example, the latent image is manifested through a known circular polarizing plate or other polarizing plates. In the patterning polarizer layer on which the latent image is displayed with visible light, the latent image can be discriminated by human eyes.

By throwing specific polarized light from the back surface side or front surface side of the optical laminated body of the present invention, the latent image set on the patterning polarizer layer appears on the opposite surface side.

According to the present invention, transmission or non-transmission of light and an intensity variation of transmitted light can be set as descried above, and therefore the patterning polarizer layer can be provided with a latent image having a more complicated pattern.

[Forming Material for Patterning Polarizer Layer]

A forming material for the patterning polarizer layer of the present invention is not particularly limited as long as it is capable of forming a polarizer, and the examples of a compound including such as an azo based compound, an anthraquinone based compound, a perylene based compound, an indanthrone based compound, an imidazole based compound, an indigoid based compound, an oxazine based compound, a phthalocyanine based compound, a triphenylmethane based compound, a pyrazolone based compound, a stilbene based compound, a diphenylmethane based compound, a naphthoquinone based compound, a merocyanine based compound, a quinophthalone based compound, a xanthene based compound, an alizarin based compound, an acridine based compound, a quinonimine based compound, a thiazole based compound, a methine based compound, a nitro based compound, and a nitroso based compound may be cited. These compounds may be used alone or in combination of two or more kinds.

As a forming material for the patterning polarizer layer, preferably a dichroic liquid crystal compound is used, and more preferably a dichroic liquid crystal compound having lyotropic liquid crystallinity is used.

The dichroic liquid crystal compound is preferably a compound showing an absorption in a visible light region (wavelength of 380 nm to 780 nm). By using a compound having absorption dichroism in a visible light region, a manifested latent image can be discriminated by human eyes. Of course, since the use of the patterning polarizer layer of the present invention is not limited to a use in which a latent image is discriminated by human eyes, a compound that absorbs light having a wavelength other than those in a visible light region may be used as the dichroic liquid crystal compound.

The lyotropic liquid crystallinity is a property of undergoing a phase transition of isotropic phase-liquid crystal phase by changing the temperature and concentration of a solution in a state of being dissolved in a solvent.

The isotropic phase is a phase in which macroscopic optical properties do not vary depending on a direction (optical anisotropy is not shown).

A compound having the lyotropic liquid crystallinity has a property of showing a liquid crystal phase and forming a supermolecule in a solution state. The structure of the supermolecule is not particularly limited, and examples thereof include micellar structures such as a spherical structure, a columnar structure and a tubular structure; and lamellar structures. The liquid crystal phase can be confirmed and identified by an optical pattern observed with a polarizing microscope.

For example, a disazo compound represented by the following general formula (1) is used as a forming material for the patterning polarizer layer of the present invention. This disazo compound has lyotropic liquid crystallinity and is a dichroic liquid crystal compound showing an absorption in a visible light region.

$$Q^1-N=N-Q^2-N=N-Q^3 \qquad (1)$$

In the general formula (1), $Q^1$ and $Q^3$ each represent a substituted or unsubstituted aryl group, and $Q^2$ represents a substituted or unsubstituted arylene group.

The substituted or unsubstituted aryl group includes an aryl group with non-adjacent carbon atoms partially substituted with nitrogen atoms. Similarly, the substituted or unsubstituted arylene group includes an arylene group with non-adjacent carbon atoms partially substituted with nitrogen atoms.

Herein, "substituted or unsubstituted" means "having a substituent or having no substituent".

Examples of the aryl group represented by $Q^1$ and $Q^3$ include a condensed ring group where two or more benzene rings are condensed, such as a naphthyl group in addition to a phenyl group. In the case where the aryl group represented by $Q^1$ and $Q^3$ has a substituent, the substituent is each independently represent, for example, an alkyl group having 1 to 4 carbon atoms, an alkoxy group having 1 to 4 carbon atoms, a thioalkyl group having 1 to 4 carbon atoms, a dihydroxy propyl group such as a hydroxy alkyl group having 1 to 4 carbon atoms, an alkyl amino group having 1 to 4 carbon atoms, a phenyl amino group having 6 to 20 carbon atoms, an acyl amino group having 1 to 4 carbon atoms, a halogeno group, a nitro group, a cyano group, an acetamide group, a phosphoric acid group, —OH group, —SO$_3$M group, —COOM group, —NHR group, and —CONHR group. M represents a counter ion. R of —NHR group represents such as a hydrogen atom, a substituted or unsubstituted alkyl group having 1 to 3 carbon atoms, a substituted or unsubstituted acetyl group, a substituted or unsubstituted benzoyl group, or a substituted or unsubstituted phenyl group.

In the case where the aryl group represented by Q$^1$ and Q$^3$ each has a substituent, the number of substituent may be one or two or more.

Q$^1$ is preferably a substituted or unsubstituted phenyl group (including a phenyl group with non-adjacent carbon atoms partially substituted with nitrogen atoms), or a substituted or unsubstituted naphthyl group (including a naphthyl group with non-adjacent carbon atoms partially substituted with nitrogen atoms), more preferably a substituted or unsubstituted phenyl group, and particularly preferably a phenyl group having a substituent.

Q$^3$ is preferably a substituted or unsubstituted naphthyl group (including a naphthyl group with non-adjacent carbon atoms partially substituted with nitrogen atoms), more preferably a naphthyl group having a substituent, and particularly preferably a naphthyl group having a polar group as a substituent. Examples of the polar group include a hydroxyalkyl group having 1 to 4 carbon atoms, an alkylamino group having 1 to 4 carbon atoms, an acylamino group having 1 to 4 carbon atoms, a nitro group, an acetamide group, a phosphoric acid group, —OH group, —SO$_3$M group, —COOM group, —NHR group, and —CONHR group. The polar group is preferably —OH group, —SO$_3$M group, and —NHR group.

Examples of the arylene group represented by Q$^2$ include a condensed ring group where two or more benzene rings are condensed, such as a naphthyl group in addition to a phenylene group. In the case where the arylene group represented by Q$^2$ has a substituent, the groups mentioned above can be cited as a substituent.

In the case where the aryl group represented by Q$^2$ has a substituent, the number of substituent may be one or two or more.

Q$^2$ is preferably a substituted or unsubstituted naphthylene group (including a naphthylene group with non-adjacent carbon atoms partially substituted with nitrogen atoms), more preferably a naphthylene group having a polar group, and particularly preferably a naphthylene group having —SO$_3$M group.

Amongst disazo compounds represented by the above general formula (1), preferable disazo compound is represented by the following general formula (2), and more preferable disazo compound is represented by the general formula (3).

(2)

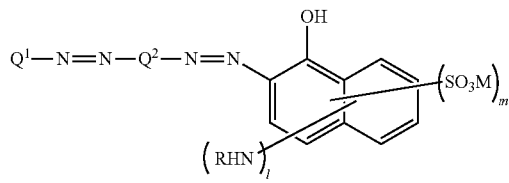

-continued (3)

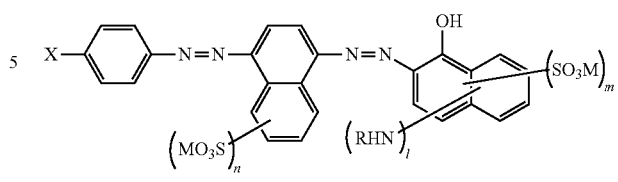

In the general formula (2), Q$^1$ and Q$^2$ are the same as the general formula (1). In the general formulas (2) and (3), R represents a hydrogen atom, a substituted or unsubstituted alkyl group having 1 to 3 carbon atoms, a substituted or unsubstituted acetyl group, a substituted or unsubstituted benzoyl group, or a substituted or unsubstituted phenyl group, l represents an integer of 0 to 2 indicating a number of substitution for —NHR group, M represents a counter ion, and m represents an integer of 0 to 6 indicating a number of substitution for —SO$_3$M group. It is, however, 0≤l+m≤6. In the general formula (3), n represents an integer of 0 to 4 indicating a number of substitution for —SO$_3$M group, X represents a hydrogen atom, a halogen atom, a nitro group, a cyano group, —OH group, an alkoxy group having 1 to 4 carbon atoms, —SO$_3$M group, —COOM group, —NHR group, or —CONHR group. M and R represents the same as the above mentioned X.

Here, at least one of m and n is an integer of 1 or more. When l, m, and n is 2 or more, respective substitutions may be the same or different.

As examples of the above-mentioned M (a counter ion), a hydrogen ion; an alkali metal ion such as Li, Na, K, and Cs; an alkaline earth metal ion such as Ca, Sr and Ba; other metal ions; an ammonium ion which may be substituted with an alkyl group or a hydroxyalkyl group; and a cation derived from an organic amine can be cited. As examples of an organic amine, a lower alkylamine having 1 to 6 carbon atoms, a lower alkylamine having 1 to 6 carbon atoms and a hydroxyl group, and a lower alkylamine having 1 to 6 carbon atoms and a carboxyl group can be cited. When M is a divalent or higher-valent cation in each general formula, M is stabilized by being electrostatically bound with other anions or M is stabilized by being shared with other disazo compounds.

The disazo compounds represented by the general formulas (1) to (3) can be synthesized in accordance with "Riron Seizoh, Senryo Kagaku (Theory Production, Dye Chemistry), 5th Edition" written by Yutaka Hosoda (published by Gihodo Shuppan Co., Ltd. on Jul. 15, 1968, pages 135 to 152).

For example, a monoazo aniline compound is obtained by converting an aniline compound having a substituent into a diazonium salt, and subjecting the salt to a coupling reaction with an aminonaphthalenesulfonic acid. After the monoazo aniline compound is converted into a diazonium salt, the above-mentioned disazo compound can be obtained by carrying out a coupling reaction with an anilino-hydroxynaphthalenedisulfonic acid under weakly alkaline.

The patterning polarizer layer of the present invention may contain a dichroic liquid crystal compound, and the content is not particularly limited. For example, the content of a dichroic liquid crystal compound in the patterning polarizer layer is 50% by mass to 100% by mass, and preferably 80% by mass to 100% by mass.

The patterning polarizer layer of the present invention may contain other ingredients besides the dichroic liquid crystal compound. Examples of the other ingredients include such as a crystal liquid compound not having a dichroic property, a polymer, and an additive. Examples of the additive include such as a compatibility accelerator, a surfactant, a thermal stabilizer, a light stabilizer, a lubricant, an antioxidant, a flame retardant, and an antistatic additive.

The content of the other ingredients is not particularly limited, however, it is more than 0% by mass and 50% by mass or less, and preferably more than 0% by mass and 20% by mass or less, for example.

The thickness of the patterning polarizer layer of the present invention is not particularly limited, however, it is preferably 0.01 µm to 10 µm, more preferably 0.1 µm to 5 µm, and particularly preferably 0.1 µm to 1 µm.

[Substrate]

A substrate is not particularly limited as long as it can be printed out using a printing machine. As an example of a substrate, a flexible polymer film, and a flexible thin metal plate can be cited. Hydrophillic treatment such as corona treatment may be performed for the substrate surface on which a coating solution is to be coated.

Preferably, the substrate surface is subjected to an alignment treatment.

The substrate surface subjected to an alignment treatment has an alignment regulating force, so that a dichroic liquid crystal compound in the coating solution can be reliably aligned. The alignment treatment is performed by giving an alignment regulating force to the substrate surface. Examples of the method for giving an alignment regulating force include (1) subjecting a substrate surface to a rubbing treatment; (2) forming a film of polyimide or the like on a substrate surface, and subjecting the surface of the film to a rubbing treatment to thereby form an alignment layer on the substrate surface; (3) forming on a substrate surface a film composed of a photoreactive compound, and irradiating the film with light to form an alignment layer on the substrate surface; and (4) acting an magnetic field or the like on a substrate surface.

The alignment direction of the substrate surface is not particularly limited, an alignment regulating force may be given in only one direction of the substrate, or an alignment regulating force may be given in each of one direction of the substrate and any different direction. For example, when a first alignment region aligned in one direction of a substrate and a second alignment region aligned in a direction orthogonal to the aforementioned direction are each formed on a substrate surface, a patterning polarizer layer having two polarizing regions, the absorption axes of which are generated in mutually orthogonal directions, as shown in FIG. 1 can be formed on the substrate surface. That is, when a plurality of (two or more) alignment regions aligned in different directions are formed on a substrate surface, a patterning polarizer layer having a plurality of polarizing regions (the directions of the absorption axes of these polarizing regions are mutually different) can be formed on the substrate surface.

The method for forming a plurality of alignment regions on the substrate surface is not particularly limited, and a conventionally known method can be employed, but a photo-alignment method as described in (3) is preferred.

At the time when alignment regions are formed on the substrate surface, the alignment regulating forces of the alignment regions may be differentiated from one another in terms of strength.

Preferably, a polymer film such as an aligned film is used as a substrate, and preferably a polymer film excellent in transparency (for example, having a haze value of 3% or less) is used.

As a material for the polymer film, polyester type such as polyethylene terephthalate; cellulose type such as triacetyl-cellulose; polycarbonate type; acryl type such as polymethyl methacrylate; styrene type such as polystyrene; olefin type such as polypropylene, and polyolefin having a ring-shaped or a norbornen structure; and the like can be cited. A norbornen type film is preferably used to align the dichroic liquid crystal compounds sufficiently.

The thickness of a substrate is not particularly limited, however, it is 20 µm to 100 µm when a polymer film is used, for example.

[Method for Production of Optical Laminated Body of the Invention]

The method for production of an optical laminated body according to the present invention includes a step of applying onto a substrate a coating solution containing the above-described dichroic liquid crystal compound and a solvent. Here, "applying" means that a coating solution is deposited on the surface of a substrate to form a coating film.

The method for production of an optical laminated body according to the present invention includes the aforementioned step as a prerequisite, and may include other steps. For example, the production method may include a step of drying the coating film obtained in the aforementioned step. The substrate is preferably a substrate given an alignment regulating force as described above.

(Preparation of Coating Solution)

The coating solution contains a dichroic liquid crystal compound and a solvent for dissolving or dispersing the dichroic liquid crystal compound. As the dichroic liquid crystal compound to be used, one selected from the compounds described above may be used alone, or two or more thereof may be used in combination.

The coating solution is obtained by dissolving or dispersing the dichroic liquid crystal compound in a solvent such as an aqueous solvent. Besides the dichroic liquid crystal compound, the above-described other components may be added to the solvent as required.

The solvent is not particularly limited and a conventionally known solvent may be used, however, an aqueous solvent is preferable. As an example of an aqueous solvent, water, a hydrophilic solvent, and a mixed solvent of water and a hydrophilic solvent can be cited. The hydrophilic solvent is a solvent which can be dissolved in water almost uniformly. As an example of a hydrophilic solvent, alcohols such as methyl alcohol, ethyl alcohol and isopropyl alcohol; glycols such as ethylene glycol and diethylene glycol; cellosolves such as methyl cellosolve and ethyl cellosolve; esters such as ethyl acetate; and the like can be cited. As the aqueous solvent, water or a mixed solvent of water and a hydrophilic solvent is used preferably.

The coating solution shows a liquid crystal phase by changing the liquid temperature and the concentration of the dichroic liquid crystal compound.

The concentration of the dichroic liquid crystal compound in the coating solution is not particularly limited, but is preferably a concentration at which the dichroic liquid crystal compound is not precipitated. The concentration may be a concentration at which the dichroic liquid crystal compound shows a liquid crystal phase in the aforementioned solution, or a concentration at which the dichroic liquid crystal compound does not show a liquid crystal phase in the solution. The concentration of the dichroic liquid crystal compound in the coating solution is preferably 0.05% by mass to 50% by mass, more preferably 0.5% by mass to 40% by mass, and particularly preferably 2% by mass to 30% by mass.

The pH of the coating solution is appropriately prepared. The pH of the coating solution is preferably about pH 2 to 10, and more preferably pH 6 to 8.

In addition, the temperature of the coating solution is prepared preferably 10° C. to 40° C., and more preferably 15° C. to 30° C.

The viscosity of the coating solution is appropriately prepared. The viscosity (23° C.) of the coating solution is preferably 1 mPa·s to 500 mPa·s.

(Application of Coating Solution)

The coating solution is applied onto the surface of the substrate described above to form a coating film.

Preferably, the coating solution is applied by a printing method using a printing machine.

The printing machine is not particularly limited, and a known industrial printing machine, household printing machine or the like can be used.

Examples of the type of the printing machine include, depending on the printing method, a digital printing machine such as an inkjet printing machine; an intaglio printing machine such as a gravure printing machine; a letterpress printing machine such as a flexographic printing machine; and a stencil printing machine such as a screen printing machine.

Among them, the digital printing machine, intaglio printing machine or stencil printing machine is preferred because the application amount of a coating solution can be easily adjusted. The application amount of the coating solution is an application amount per unit area of the substrate surface. When the application amount is increased, a polarizing region having a large thickness can be formed, and conversely when the application amount is decreased, a polarizing region having a small thickness can be formed. Thus, when the above-mentioned printing machines are used, a plurality of polarizing regions different in thickness can be easily formed.

In particular, it is more preferred to use a digital printing machine such as an inkjet printing machine. The digital printing machine can adjust the application amount of a coating solution by adjustment of the ink density in setting of printing conditions, and can apply a coating solution to a substrate in various patterns because it is not dependent on a plate.

Using the aforementioned printing machine, a coating solution is applied to the surface of a substrate in an appropriate pattern.

For example, when a certain coating solution is applied in a predetermined thickness to a first region of a substrate surface, and applied in a smaller thickness to other regions of the substrate surface, a patterning polarizer, the thickness of which is different for each polarizing region, can be obtained. By using such a coating solution and changing the coating thickness, a patterning polarizer layer having two or more polarizing regions having different single transmittances can be obtained.

The coating solution may be repeatedly applied to one region. For example, when a coating solution is repeatedly applied in a predetermined thickness two or more times to one region of a substrate surface, and applied once in the same thickness to other regions of the substrate surface, a patterning polarizer layer having two or more polarizing regions having different single transmittances can be obtained.

Further, two or more coating solutions may be used. For example, when a first coating solution is applied in a predetermined thickness to a first region of a substrate surface, while a second coating solution is applied in a predetermined thickness to a second region of the substrate surface, a patterning polarizer layer having two or more polarizing regions having different single transmittances can be obtained. The two or more coating solutions mean coating solutions which do not have the same composition. For example, two or more coating solutions have different types and/or contents of dichroic liquid crystal compounds contained therein.

The substrate, to which the coating solution is applied, is preferably one subjected to an alignment treatment as described above. An alignment direction of a substrate surface by the alignment treatment, regions thereof, arrangement of regions thereof, and the like may be appropriately set in consideration of a patterning polarizer layer to be formed.

The plane shape of the substrate may be a sheet shape or a long shape. The optical laminated body of the present invention can also be continuously produced in a roll-to-roll method by using a long-shape substrate.

A coating film can be formed by appropriately applying a coating solution to the surface of a substrate using a printing machine.

When a coating solution is applied to the surface of a substrate, a dichroic liquid crystal compounds in the coating film are aligned in accordance with a direction of an alignment regulating force of the substrate surface. For example, when three alignment regions having mutually different alignment directions are formed on a substrate surface by an alignment treatment, the dichroic liquid crystal compound can be aligned in three directions in accordance with the alignment directions of the alignment regions.

For enhancing alignment of the dichroic liquid crystal compounds, a magnetic field or an electric field may be applied as required after the coating film is formed.

By drying the coating film after application (uncured coating film), the aligned dichroic liquid crystal compounds are fixed. In the manner described above, the optical laminated body of the present invention in which a patterning polarizer layer is formed on a substrate can be obtained (the cured coating film is the patterning polarizer layer).

Drying of the uncured coating film can be performed by natural drying or forced drying or the like. Examples of forced drying include drying under reduced pressure, heating drying and heating drying under reduced pressure.

The surface of the cured coating film may be subjected to a known water resistant treatment.

When a printing machine is used as described above, a patterning polarizer layer having two or more polarizing regions different in thickness can be easily formed. Accordingly, a patterning polarizer layer having two or more polarizing regions having different single transmittances can be easily formed.

When a printing machine is used, the application position and application amount of a coating solution can be easily set, so that a patterning polarizer layer having a multiple tone pattern can be easily formed.

The present invention is further described using Examples as follows. However, the present invention is not limited to only these Examples below. Here, methods for each analysis used in Examples are as follows.

[Method for Observation of Liquid Crystal Phase]

A small amount of a solution was held between two sheets of slide glass, and a liquid crystal phase was observed using a polarizing microscope (manufactured by Olympus Corporation, trade name "OPTIPHOT-POL") provided with a large-scale sample heating/cooling stage for microscopes (manufactured by Japan High Tech Co. Ltd., trade name "10013L").

[Method for Measurement of Single transmittance]

The single transmittance of an optical laminated body was measured at a measurement wavelength of 550 nm using a microspectroscopic system (manufactured by Lambda-Vision Inc., trade name "LV-microIV").

EXAMPLE 1

(Synthesis of Disazo Compound and Preparation of Coating Solution)

4-nitroaniline and 8-amino-2-naphthalenesulfonic acid were caused to undergo diazotization and coupling reaction by a usual method in accordance with "Riron Seizoh, Senryo Kagaku (Theory Production, Dye Chemistry), 5th Edition"

written by Yutaka Hosoda (published by Gihodo Shuppan Co., Ltd. on Jul. 15, 1968, pages 135 to 152) to yield a monoazo compound. The resultant monoazo compound was diazotized by the usual method, and further the resultant was caused to undergo a coupling reaction with 1-amino-8-naphthol-2,4-disulfonic acid lithium salt, thereby yielding a crude product containing disazo compound represented by the following formula (4). This crude product was salted out with lithium chloride to yield an disazo compound having the following formula (4):

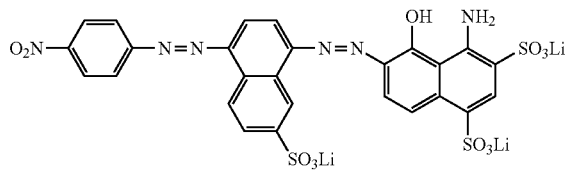

(4)

This disazo compound was dissolved into ion exchange water, and a solution of a disazo compound concentration of 20% by mass was prepared. When the solution of concentration of 20% by mass was observed at 23° C. in accordance with the observation method of the liquid crystal phase, a nematic liquid crystal phase was exhibited.

The solution was further diluted by adding ion exchange water, and a coating liquid of a disazo compound concentration of 8% by mass was prepared.

(Formation of Patterning Polarizer Layer)

A norbornene-based polymer film having a thickness of 100 μm (manufactured by Zeon Corporation, trade name "ZEONOR") was used as a substrate.

The surface of the substrate was subjected in one direction to a rubbing treatment using a rubbing cloth (manufactured by Yoshikawa Chemical Co., Ltd., trade name "Fine Puff"). Further, the surface of the substrate (rubbing treatment surface) was subjected to a corona treatment.

An inkjet printer (manufactured by SEIKO EPSON CORPORATION, trade name "PX-101") was charged with the coating solution in place of ink. The coating solution was applied to the rubbing treatment surface of the substrate in accordance with a predetermined printing pattern using the printer.

Printing data of a shaded monochromatic image (PowerPoint) as shown in FIG. 11 was used as the printing pattern.

Thereafter, the substrate was placed in a thermostatic chamber at 23° C. to naturally dry the coating film sufficiently, thereby preparing an optical laminated body having a patterning polarizer layer.

FIG. 11 shows an enlarged part of a photograph of the surface of the prepared optical laminated body.

The single transmittance at one location (location A in FIG. 11) of the obtained optical laminated body was measured, and found to be 74.1%, and the single transmittance at another location (location B in FIG. 11) was 83.2%.

When the obtained optical laminated body was observed through a polarizing plate, it was confirmed that the patterning polarizer layer had regions of transmission and non-transmission of light. That is, it was confirmed that the obtained optical laminated body had dichroism in a visible light region.

EXAMPLE 2

An optical laminated body was prepared in the same manner as in Example 1 except that the printing pattern was changed.

Figure 12:
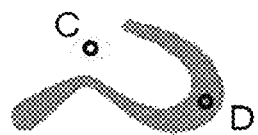
FIG. 12 is a photographic view of an enlarged part of the surface of an optical laminated body prepared in Example 2.

Printing data of a shaded monochromatic image (PowerPoint) as shown in FIG. 12 was used as the printing pattern.

FIG. 12 shows an enlarged part of a photograph of the surface of the prepared optical laminated body.

The single transmittance at one location (location C in FIG. 12) of the obtained optical laminated body was measured, and found to be 78.5%, and the single transmittance at another location (location D in FIG. 12) was 36.7%.

When the obtained optical laminated body was observed through a polarizing plate in the same manner as in Example 1, it was confirmed that the patterning polarizer layer had regions of transmission and non-transmission of light.

EXAMPLE 3

An optical laminated body was prepared in the same manner as in Example 1 except that a gravure printing machine (manufactured by J M Heaford, Ltd., trade name "ROTOGRAVURE CYLINDER PROOFING SYSTEMS") was used in place of the inkjet printer and the printing pattern was changed.

Figure 13:
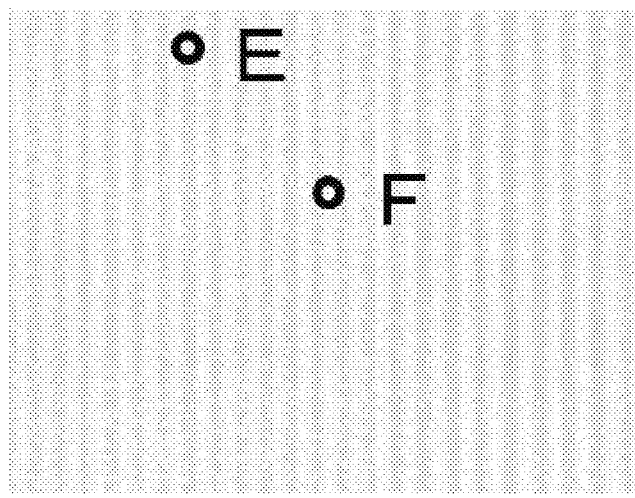
FIG. 13 is a photographic view of an enlarged part of the surface of an optical laminated body prepared in Example 3.

A gravure plate having a stripe pattern as shown in FIG. 13 was used as the printing pattern.

FIG. 13 shows an enlarged part of a photograph of the surface of the prepared optical laminated body.

The single transmittance at one location (location E in FIG. 13) of the obtained optical laminated body was measured, and found to be 45.7%, and the single transmittance at another location (location F in FIG. 13) was 65.9%.

When the obtained optical laminated body was observed through a polarizing plate in the same manner as in Example 1, it was confirmed that the patterning polarizer layer had regions of transmission and non-transmission of light.

INDUSTRIAL APPLICABILITY

The optical laminated body of the present invention can be used for components of forgery prevention labels, image display devices, and the like.

1A, 1B, 1C, 1D, 1E, 1F Optical laminated body
2A, 2B, 2C, 2D, 2E, 2F Substrate
3A, 3B, 3C, 3D, 3E, 3F Patterning polarizer layer
31A, 31B, 31C, 31D, 31E, 31F First polarizing region
32A, 32B, 32C, 32D, 32E, 32F Second polarizing region

What is claimed is:
1. An optical laminated body comprising:
a patterning polarizer layer having at least two polarizing regions having different single transmittances; and a substrate,
wherein at the boundary of two polatizing regions, the thickness of one polarizing region and the thickness of the other polarizing region are different from each other and discontinuous.

2. The optical laminated body according to claim 1, wherein the patterning polarizer layer is formed by applying to the surface of the substrate a coating solution containing a dichroic liquid crystal compound using a printing method.

3. The optical laminated body according to claim 1, wherein the patterning polarizer layer contains an aligned dichroic liquid crystal compound.

4. The optical laminated body according to claim 2, wherein the dichroic liquid crystal compound has lyotropic liquid crystallinity.

* * * * *